(12) United States Patent
Baik et al.

(10) Patent No.: US 9,658,514 B2
(45) Date of Patent: May 23, 2017

(54) CAMERA MODULE

(71) Applicant: Samsung Electro-Mechanics Co., Ltd., Suwon-si (KR)

(72) Inventors: Jae Ho Baik, Suwon-si (KR); Won Seob Oh, Suwon-si (KR); Hoon Heo, Suwon-si (KR); Jung Seok Lee, Suwon-si (KR); Jae Hyuk Lee, Suwon-si (KR); Yong Joon Park, Suwon-si (KR); Jung Wook Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/861,360

(22) Filed: Sep. 22, 2015

(65) Prior Publication Data

US 2016/0054641 A1    Feb. 25, 2016

Related U.S. Application Data

(63) Continuation of application No. 13/801,031, filed on Mar. 13, 2013, now Pat. No. 9,188,762.

(30) Foreign Application Priority Data

May 30, 2012    (KR) .................. 10-2012-0057542

(51) Int. Cl.
 *G03B 3/10*    (2006.01)
 *G02B 7/04*    (2006.01)
 *G02B 7/08*    (2006.01)

(52) U.S. Cl.
 CPC .............. *G03B 3/10* (2013.01); *G02B 7/04* (2013.01); *G02B 7/08* (2013.01)

(58) Field of Classification Search
 CPC ........................................................ G02B 7/08
 (Continued)

(56) References Cited

U.S. PATENT DOCUMENTS

| 2007/0154198 A1* | 7/2007 | Oh | ............... | G02B 7/102 |
| | | | | 396/85 |
| 2008/0192368 A1* | 8/2008 | Sue | ............... | G02B 7/102 |
| | | | | 359/824 |

(Continued)

FOREIGN PATENT DOCUMENTS

| CN | 101387730 A | 3/2009 |
| JP | 2008-040188 A | 2/2008 |

(Continued)

OTHER PUBLICATIONS

Korean Office Action issued May 29, 2013 in corresponding Korean Application No. 10-2012-0057542.

(Continued)

*Primary Examiner* — James Jones
(74) *Attorney, Agent, or Firm* — NSIP Law

(57) ABSTRACT

Disclosed herein is a camera module in which a movement of a magnet is controlled by only magnetic force between the magnet and a yoke without a spring for controlling the movement of the magnet which operates up and down. The camera module includes: a lens module; and a main frame supporting the lens module and allowing the lens module to be driven in an optical axis direction, wherein the lens module includes: a lens assembly including a plurality of lenses; and a magnet fixed to one side of the lens module, and the main frame includes: a coil facing the magnet, fixed to one side within the main frame, and generating an electric field as power is applied thereto; and a yoke disposed to face (Continued)

the magnet with the main frame and the coil interposed therebetween and controlling driving of the lens module by attraction with the magnet.

5 Claims, 5 Drawing Sheets

(58) Field of Classification Search
USPC .......................................................... 359/824
See application file for complete search history.

(56) References Cited

U.S. PATENT DOCUMENTS

| | | |
|---|---|---|
| 2009/0073585 A1 | 3/2009 | Yamashita |
| 2010/0128371 A1 | 5/2010 | Yoon et al. |

FOREIGN PATENT DOCUMENTS

| | | |
|---|---|---|
| KR | 10-2010-0005313 A | 1/2010 |
| KR | 10-2010-0006629 A | 1/2010 |
| KR | 10-2011-0086936 A | 8/2011 |
| KR | 20-2011-0008478 U | 8/2011 |
| KR | 20-2011-0008714 U | 9/2011 |
| WO | WO 2011/105470 A1 | 9/2011 |

OTHER PUBLICATIONS

Chinese Office Action issued Feb. 5, 2015 in corresponding Chinese Application No. 201310131586.0 (13 pages with English translation).

\* cited by examiner

【FIG. 4B】

CAMERA MODULE

CROSS REFERENCE TO RELATED APPLICATIONS

This application is a continuation of U.S. patent application Ser. No. 13/801,031, filed Mar. 13, 2013, which claims the benefit under 35 U.S.C. Section 119 of Korean Patent Application Serial No. 10-2012-0057542, entitled "Camera Module" filed on May 30, 2012, which is hereby incorporated by reference in its entirety into this application.

BACKGROUND OF THE INVENTION

1. Technical Field

The present invention relates to a camera module, and more particularly, to a camera module in which a movement of a magnet is controlled using only the attraction between the magnet and a yoke without a spring for controlling the movement of the magnet which operates up and down.

2. Description of the Related Art

Recently, in line with the development of digital camera manufacturing technologies, mobile communication terminals equipped with a compact and lightweight camera module has been released.

A camera includes a plurality of lenses for focusing and zooming function, and focusing is adjusted by adjusting relative distances between the plurality of lenses. A driving unit of a mobile communication terminal for auto-focusing serves to adjust focus to an image sensor by moving a lens in an optical axis direction. A camera module including such a driving unit is required to be firmly operated over external impact, but as terminals have been increasingly multifunctional and compact, the size of a camera module is reduced, resulting in a camera module that is vulnerable to external impact.

In the related art, in order to lessen external impact, a stopper is installed on upper and lower portions of a camera module and a buffering member is added to the stopper, but this method has a problem in which an additional component should be used, which does not allow a camera to be reduced in size. An elastic member based on pre-load is used to alleviate external impact, but here, since the pre-load should be constantly applied in a direction opposite to a direction in which a lens is driven, power consumption is increased.

SUMMARY OF THE INVENTION

An object of the present invention is to reduce the size of a camera module by reducing a speed of a driving unit by only the attraction between a magnet and a yoke, without using stoppers otherwise installed at upper and lower portions of the camera module, to thus lessen impact and eliminate the use of an additional component, and to prevent unnecessary power consumption by eliminating an elastic member corresponding to pre-load.

According to an exemplary embodiment of the present invention, there is provided a camera module including: a lens module; and a main frame supporting the lens module and allowing the lens module to be driven in an optical axis direction, wherein the lens module includes: a lens assembly including a plurality of lenses; and a magnet fixed to one side of the lens module, and the main frame includes: a coil facing the magnet, fixed to one side within the main frame, and generating an electric field as power is applied thereto; and a yoke disposed to face the magnet with the main frame and the coil interposed therebetween and controlling driving of the lens module by attraction with the magnet.

When the lens module is positioned at the highest point in the optical axis direction, the uppermost end portion of the yoke may be positioned between the uppermost end portion and the lowermost end portion of the magnet.

Force driving the lens module upwardly in the optical axis direction may be equal to the attraction between the magnet and the yoke.

When the lens module is positioned at the lowermost point in the optical axis direction, the lowermost end portion of the yoke may be positioned between the uppermost end portion and the lowermost end portion of the magnet.

Force driving the lens module downwardly in the optical axis direction may be equal to attraction between the magnet and the yoke.

The camera module may further include: a support member having a V or U shape and fixed to one lateral surface or both lateral surfaces of an outer side of the lens module so as to be formed in the optical axis direction; and a guide member fixed within the main frame and accommodating the support member having the V or U shape such that the lens module moves in the optical axis direction.

The camera module may further include: a position sensor positioned within a winding of the coil and sensing a position of the magnet.

A plurality of magnets and a plurality of yokes may be provided.

The camera module may further include: a plate spring positioned at a lateral lower portion within the main frame and providing restoring force to the lens module at a point lower than a lower critical point in an optical axis direction in which the lens module is driven.

The camera module may further include: a plate spring positioned at a lateral upper portion within the main frame and providing restoring force to the lens module at a point higher than an upper critical point in an optical axis direction in which the lens module is driven.

BRIEF DESCRIPTION OF THE DRAWINGS

FIGS. 4A and 4B are graphs showing a comparison of attraction between the magnet and the yoke according to an embodiment of the present invention and a related art.

DESCRIPTION OF THE PREFERRED EMBODIMENTS

Hereinafter, exemplary embodiments of the present invention will be described in detail with reference to the accompanying drawings. However, this is only by way of example and therefore, the present invention is not limited thereto.

When technical configurations known in the related art are considered to make the contents obscure in the present invention, the detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

Hereinafter, the exemplary embodiments of the present invention will be described with reference to the accompanying drawings.

Figure 1:
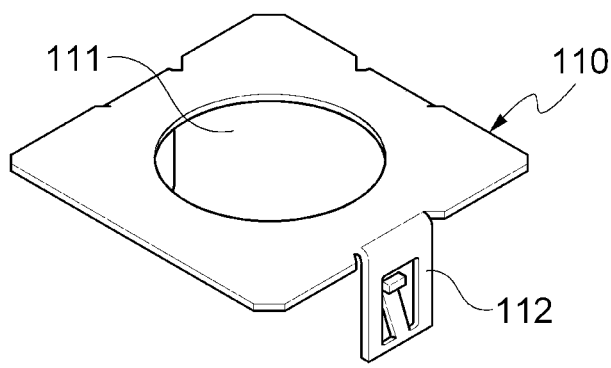
FIG. 1 is a perspective view of a camera module according to an embodiment of the present invention.
Figure 1:
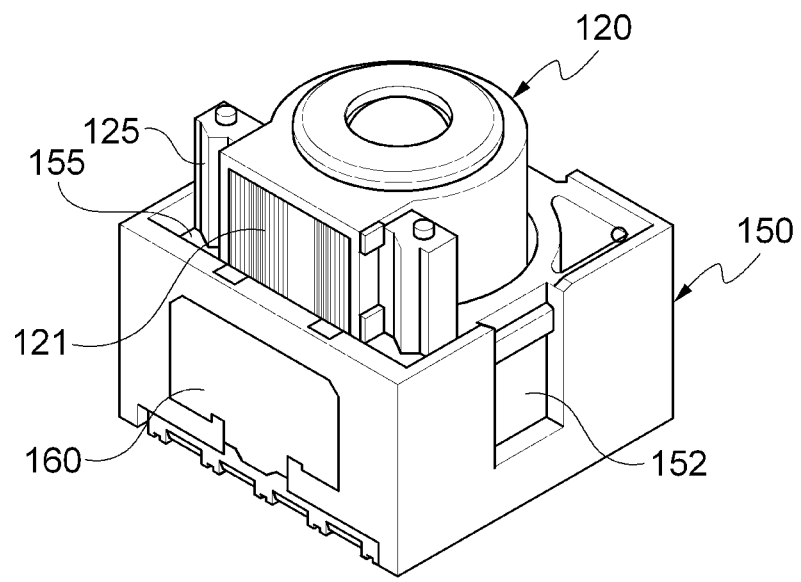
Figure 2:
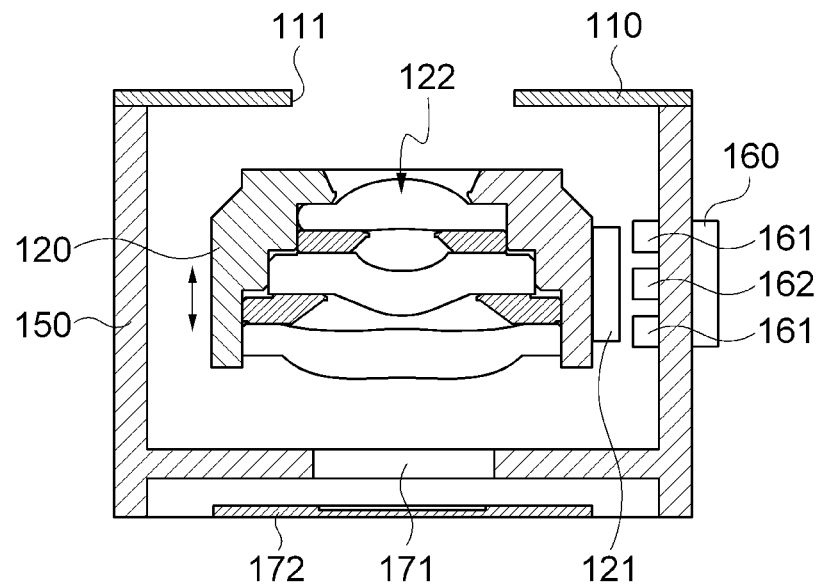
FIG. 2 is a cross-sectional view of the camera module according to an embodiment of the present invention.

FIG. 1 is a perspective view of a camera module according to an embodiment of the present invention. FIG. 2 is a cross-sectional view of the camera module according to an embodiment of the present invention.

With reference to FIGS. 1 and 2, a camera module 100 according to an embodiment of the present invention may include a lens module 120; and a main frame 150 supporting the lens module 120 and driven in an optical axis direction. The lens module 120 may include a lens assembly 122 including a plurality of lenses; and a magnet 121 fixed to one side of the lens module 120. The main frame 150 may include a coil 161 facing the magnet 121, fixed to one side of the main frame 150 within the main frame 150, and generating an electric field when power is applied thereto; and a yoke 160 facing the magnet 121 with the main frame 150 and the coil 161 interposed therebetween and controls driving of the lens module 120 by attraction with the magnet 121. In this case, a plurality of magnets 121 and a plurality of yokes 160 may be provided.

Having the yoke 160, the main frame 150 concentrates an electric field generated when power is applied to the coil 161 and a magnetic field of the magnet 121 to a space between the coil 161 and the magnet 121. When power is not applied to the coil 161, attraction may be generated between the magnet 121 and the yoke 160. When the lens module 120 is driven up and down in the optical axis direction in a state in which power is not applied to the coil 161, attraction is generated in a direction opposite to the direction in which the lens module 120 is driven between the magnet 121 and the yoke 160 from an upper critical point or a lower critical point with respect to the optical axis direction in which the lens module 120 may be driven, so driving of the lens module may be controlled. Here, the upper critical point or the lower critical point may refer to a point at which the lens module 120 may collide with other components to receive impact first when normally driven in the optical axis direction. Details thereof will be described hereinafter.

When viewed in the optical axis direction, an upper portion of the main frame 150 may include an opening 111 having the same shape as a shape of the lens module 120 viewed from above so as to be coupled with the lens module 120, and an opening 111 may be formed on a lower portion of the main frame 150 in order to transmit electrical signal of a subject to a controller (not shown) of the lens module 120. Thus, the main frame 150 may serve to house the lens module 120.

The camera module 100 may further include a support member 125 having a V or U shape and fixed to one lateral surface or both lateral surfaces of an outer side of the lens module 120 so as to be formed in the optical axis direction; and a guide member 155 fixed within the main frame 150 and accommodating the support member 125 having the V or U shape such that the lens module 120 moves in the optical axis direction.

The lens module 120 may include the lens assembly 122. The lens assembly 122 may include a plurality of focusing lenses, and diameters and curvatures of the plurality of lenses may be different within a range required for the performance of the product. The plurality of lenses may be assembled within the lens module 120.

The camera module 100 may further include a position sensor 162 positioned within a winding of the coil 161 and sensing the position of the magnet 121. In this case, the position sensor 162 may sense a position of the magnet 121 in the optical axis direction. Namely, sensing a position of the magnet 121, the position sensor 162 may sense and detect a change in a position of the lens module 120 and generate a control signal required for focusing.

The coil 161 may be wound to face the magnet 121 such that it interacts with the magnet 121 to generate driving force based on electromagnetic force. The camera module 100 may further include a cover glass 171 and an image sensor 172. When a user presses an image capture button, the image sensor 172 operates and then an image of a subject may pass through the lens assembly 122 so as to be changed into an electrical signal in the image sensor 172, and the electrical signal may be transmitted to a controller (not shown) within the camera module 100. If the image of the subject is dim, the electrical signal may be set to be weak and, in this case, it may be determined that there is an error in focusing the lens assembly 122 and a current for moving the lens module 120 in the optical axis direction may be applied to the coil 161. Namely, an electrical field generated as a current is applied to the coil and a magnetic field of the magnet 121 interact to move the lens module 120 up and down in the axial direction, thus focusing the lens assembly 122.

The camera module 100 may further include a cover 110 covering the upper end portion of the lens module 120. The cover 110 may include the opening 111 formed in a penetrative manner in the optical axis direction. Since the opening 111 provides an image capture path with respect to the lens module 120, the lens module 120 may capture an image of a subject through the opening 111.

The cover 110 may include a binding piece 112, and the main frame 150 may include a binding recess 152 to be coupled with the binding piece 112. The binding piece 112 may be formed on edges at both sides of the cover 110 in a facing manner and include a binding hook formed by cutting away a portion thereof. The binding hook may have an inwardly bent shape. In order to be coupled with the cover 110, the main frame 150 may have a binding recess 152 formed on an outer surface thereof, and a hook recess may be formed in the binding recess 152. When the cover 110 is coupled to the main frame 150, the binding piece 112 is accommodated in the binding recess 152 and, in this case, the binding hook may be coupled to the hook recess so as to be bound to the hook recess.

Figure 3A:
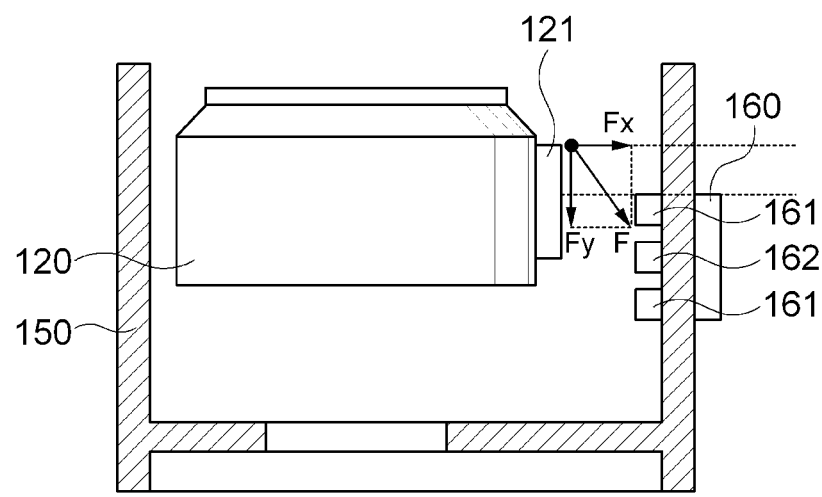
FIGS. 3A and 3B are views illustrating attraction between a magnet and a yoke according to a vertical movement of the camera module according to an embodiment of the present invention.
Figure 3B:
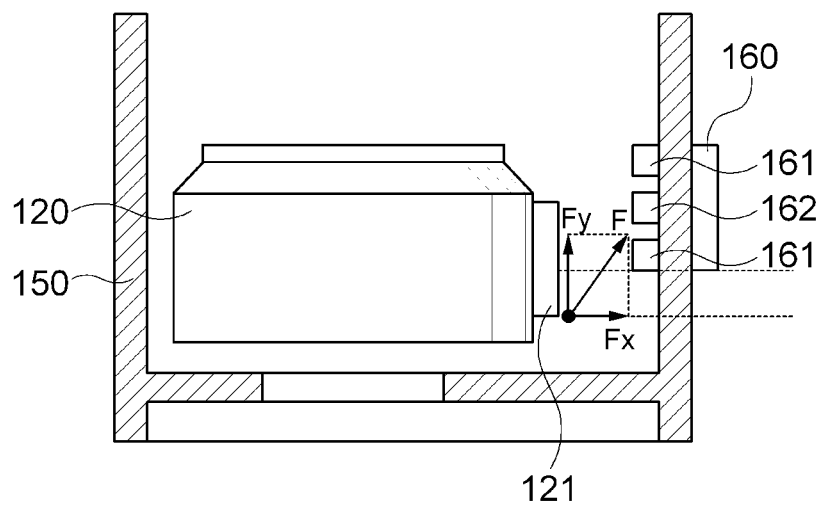
Figure 4A:
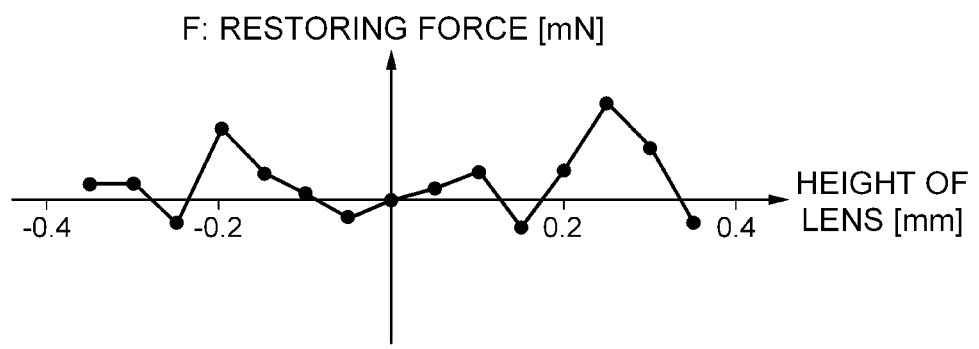
Figure 4A:
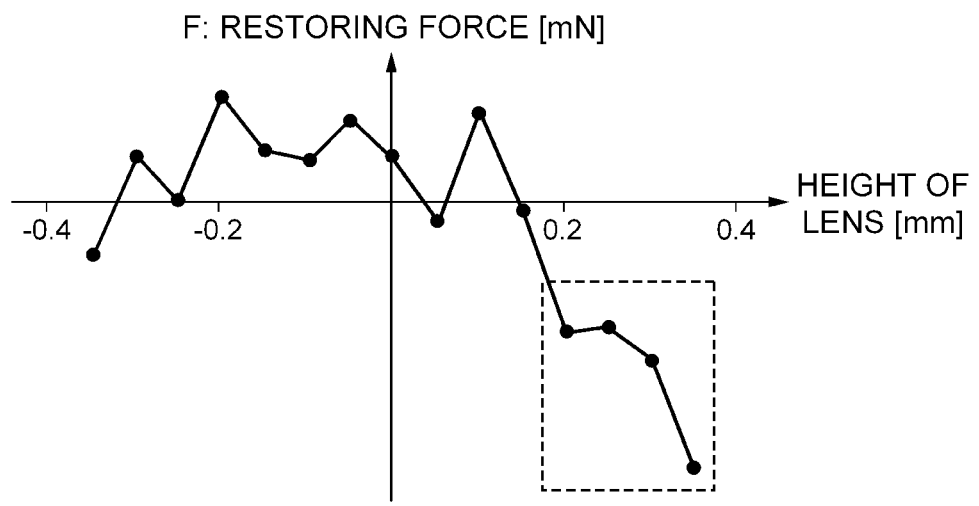

FIGS. 3A and 3B are views illustrating attraction between the magnet 121 and the yoke 160 according to a vertical movement of the camera module 100 according to an embodiment of the present invention. FIGS. 4A and 4B are graphs showing a comparison of attraction between the magnet 121 and the yoke 160 according to an embodiment of the present invention and a related art.

An impulse I of an object may be expressed by I=F*t=m*v (m is a mass of the object and v is a velocity of the object). Namely, noise and damage of the object by impact is proportional to the impulse, and according to the above formula with respect to an impulse of the object, when the mass of the object is reduced or when the velocity of the object is reduced, the impulse of the object may be reduced. Thus, according to an embodiment of the present invention, an impulse with respect to the lens module 120 may be reduced by reducing a driving velocity of the lens module 120 due to external impact. Here, in the camera module 100 according to an embodiment of the present invention, an impulse with respect to the lens module 120 is intended to be reduced by reducing the velocity of the lens module 120 by only attraction between the magnet 121 and the yoke 160.

When the lens module 120 is positioned at the highest point in the optical axis direction, it may mean that the lens module 120 is at the upper critical point as mentioned above. Namely, the highest point or the upper critical point of the lens module 120 in the optical axis direction may refer to a point at which the lens module 120 may initially receive impact due to a collision with other components when the lens module 120 is driven upwardly in the optical axis direction. Similarly, when the lens module 120 is positioned at the lowest point in the optical axis direction, it may mean that the lens module 120 is at the lower critical point as mentioned above. Namely, the highest point or the lower critical point of the lens module 120 in the optical axis direction may refer to a point at which the lens module 120 may initially receive impact due to a collision with other components when the lens module 120 is driven downwardly in the optical axis direction.

With reference to FIG. 3A, when the lens module 120 is positioned at the highest point in the optical axis direction, an upper end portion of the yoke 160 may be positioned between the uppermost end portion and the lowermost end portion of the magnet 121.

When the uppermost end portion of the yoke 160 is positioned between the uppermost end portion and the lowermost end portion of the magnet 121, attraction between the yoke 160 and the magnet 121 may act in the downward direction Fy and in a vertical direction Fx, respectively. Resultant force F as shown in FIG. 3A may act as the vector sum of the attraction in the downward direction and the attraction in the vertical direction. In this case, force by which the lens module 120 is driven upwardly in the optical axis direction may be equal to the attraction F between the magnet 121 and the yoke 160. Thus, the lens module 120 may be freely driven between the upper critical point and the lower critical point, and here, even if impact is strong enough to release the lens module 120 from the upper critical point is applied to the lens module 120, the lens module 120 is not released from the upper critical point due to the attraction between the magnet 121 and the yoke 160, so that the lens module is not damaged by external impact.

Similarly, with reference to FIG. 3B, when the lens module 120 is positioned at the lowest point in the optical axis direction, and lowermost end portion of the yoke 160 may be positioned between the uppermost end portion and the lowermost end portion of the magnet 121.

When the lowermost end portion of the yoke 160 is positioned between the uppermost end portion and the lowermost end portion of the magnet 121, attraction between the yoke 160 and the magnet 121 may act in the upward direction Fy and in a vertical direction Fx with respect to the optical axis direction, respectively. Resultant force F as shown in FIG. 3B may act as the vector sum of the attraction in the upward direction and the attraction in the vertical direction. In this case, force by which the lens module 120 is driven downwardly in the optical axis direction may be equal to the attraction F between the magnet 121 and the yoke 160. Thus, the lens module 120 may be freely driven between the upper critical point and the lower critical point, and here, even if impact strong enough to release the lens module 120 from the lower critical point is applied to the lens module 120, the lens module 120 is not released from the lower critical point due to the attraction between the magnet 121 and the yoke 160, such that the lens module is not damaged by external impact.

FIG. 4A is a graph of restoring force of the related art camera module, and FIG. 4B is a graph of restoring force of the camera module according to an embodiment of the present invention. Here, restoring force may refer to force that will return the lens module 120 in a direction opposite to the driving direction based on external impact. Namely, the restoring force may refer to the attraction F between the magnet 121 and the yoke 160 as described above. With reference to a portion indicated by the dotted line in FIG. 4B, it can be seen that as the position of the lens module 120 is closer to the highest point, restoring force is sharply increased. Namely, as the lens module 120 moves to be closer to the upper critical point as described above by external impact, attraction between the magnet 121 and the yoke 160 is increased, and resultantly, the absolute value of the attraction and that of the size of force by the external impact are equal at the upper critical point, and thus, driving of the lens module 120 by external impact may be stopped. This is the same when the lens module 120 is close to the lower critical point by external impact as described above.

FIGS. 5A-5B and 6A-6B are cross-sectional views of a camera module according to another embodiment of the present invention.

Figure 5A:
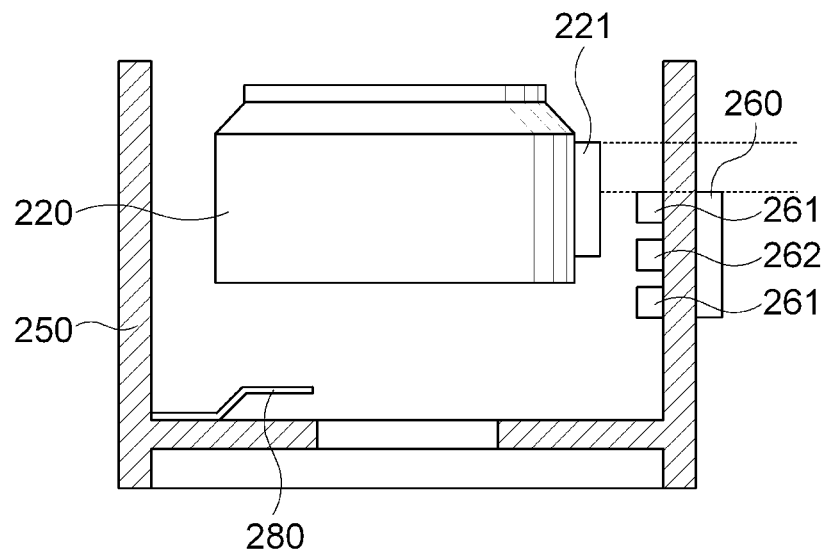
FIGS. 5A and 5B are cross-sectional views of a camera module according to another embodiment of the present invention.
Figure 5B:
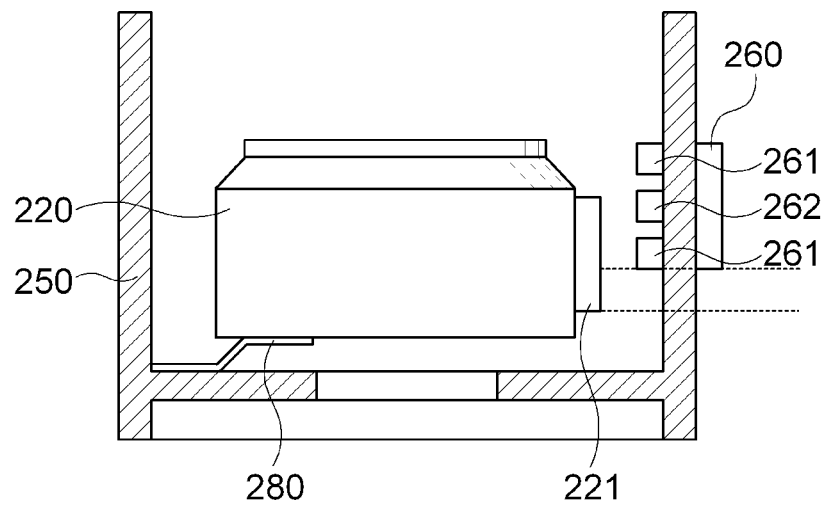

With reference to FIGS. 5A and 5B, the camera module may further include a plate spring 280 positioned at a lateral lower portion within a main frame 250 and providing restoring force to a lens module 220 at a point lower than a lower critical point in an optical axis direction in which the lens module 220 may be driven. The plate spring 280 may physically prevent the lens module 220 from being released from the lower critical point when the lens module 220 is driven downwardly in the optical axis direction by external impact. Namely, the plate spring 280 may serve to prevent the lens module 220 from being released from the lower critical point together with attraction between the magnet 221 and the yoke 260.

Figure 6A:
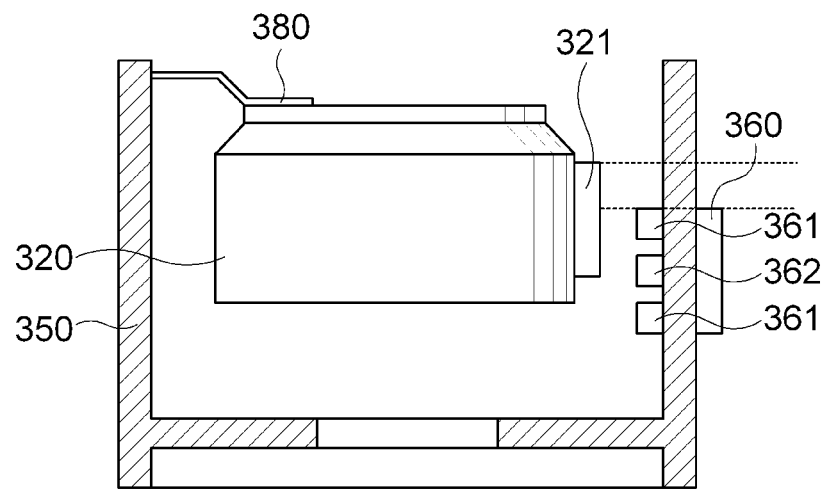
FIGS. 6A and 6B are cross-sectional views of a camera module according to another embodiment of the present invention.
Figure 6B:
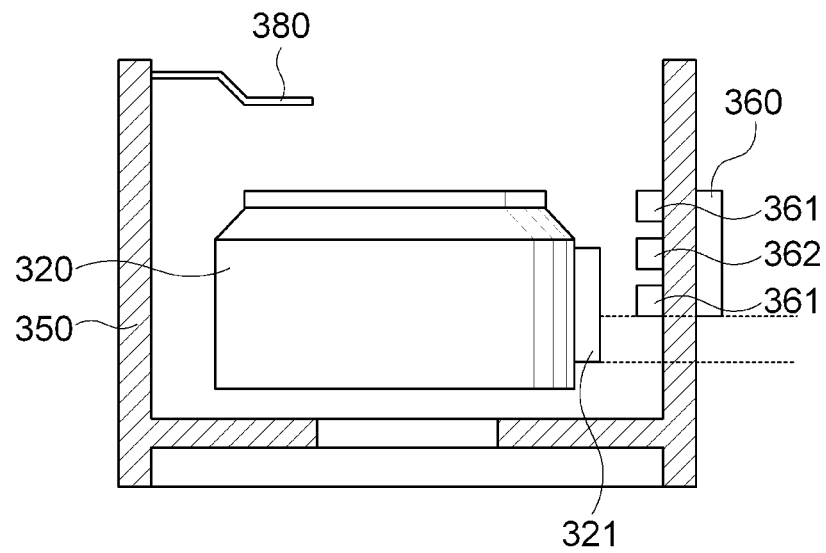

Similarly, with reference to FIGS. 6A and 6B, the camera module may further include a plate spring 380 positioned at a lateral upper portion within a main frame 350 and providing restoring force to a lens module 220 at a point higher than an upper critical point in an optical axis direction in which the lens module 220 may be driven.

According to the exemplary embodiments of the present invention, a movement speed of the lens module is reduced by only attraction between the magnet and the yoke, without having to install a stopper for lessening impact with respect to the lens module at upper and lower portions of the camera module, whereby the use of an additional component can be eliminated, reducing production unit costs and reducing the size of the camera module.

In addition, since impact is lessened by reducing the speed of the lens module only through attraction between the magnet and the yoke, an elastic member based on a pre-load can be eliminated, thus preventing power consumption due to the pre-load.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

What is claimed is:

1. A camera module comprising:
a lens module comprising a lens assembly;
a main frame accommodating the lens module therein;
a driving part comprising a magnet and a coil that are configured to generate a driving force that drives the lens module in an optical axis direction; and
a yoke fixed to the main frame,
wherein, when the lens module is driven in the optical axis direction in a state in which power is not applied to the coil, a velocity of the lens module is controlled by attractive force between the magnet and the yoke.

2. The camera module according to claim 1, wherein as the lens module is driven to be closer to an object or an image sensor, the velocity of the lens module is reduced by the attractive force between the magnet and the yoke.

3. The camera module according to claim 1, wherein as the lens module is driven to be closer to an object or an image sensor, the attractive force between the magnet and the yoke is increased.

4. The camera module according to claim 1, wherein the velocity of the lens module is controlled by a sum of attractive force generated in the optical axis direction and attractive force generated in a direction perpendicular to an optical axis.

5. The camera module according to claim 1, further comprising a position sensor sensing a position of the magnet.

* * * * *